US009830370B2

(12) United States Patent
Wong et al.

(10) Patent No.: US 9,830,370 B2
(45) Date of Patent: Nov. 28, 2017

(54) VISUALIZATION SUGGESTION APPLICATION PROGRAMMING INTERFACE

(71) Applicants: Johnson Wong, Vancouver (CA); Flavia Moser, Vancouver (CA); Viren Kumar, Vancouver (CA)

(72) Inventors: Johnson Wong, Vancouver (CA); Flavia Moser, Vancouver (CA); Viren Kumar, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 369 days.

(21) Appl. No.: 14/490,172

(22) Filed: Sep. 18, 2014

(65) Prior Publication Data
US 2016/0085835 A1   Mar. 24, 2016

(51) Int. Cl.
G06F 17/30   (2006.01)
(52) U.S. Cl.
CPC .. G06F 17/30572 (2013.01); G06F 17/30315 (2013.01); G06F 17/30554 (2013.01); G06F 17/30563 (2013.01); G06F 17/30592 (2013.01); G06F 17/30601 (2013.01)
(58) Field of Classification Search
CPC ......... G06F 17/30315; G06F 17/30554; G06F 17/30563; G06F 17/30572; G06F 17/30592; G06F 17/30601
USPC ...................................................... 707/752
See application file for complete search history.

(56) References Cited

U.S. PATENT DOCUMENTS

| 5,978,788 | A * | 11/1999 | Castelli | G06F 17/30489 |
| 8,219,560 | B2 * | 7/2012 | Abhyankar | G06F 17/30643 707/738 |
| 9,135,233 | B2 * | 9/2015 | Fan | G06F 17/30554 |
| 9,418,336 | B2 * | 8/2016 | Peev | G06K 9/00496 |
| 9,424,314 | B2 * | 8/2016 | Maybee | G06F 17/30466 |

(Continued)

OTHER PUBLICATIONS

"European Application Serial No. 14004376.1, Search Report mailed Mar. 4, 2015", 9 pgs.

(Continued)

Primary Examiner — Jean M Corrielus
(74) Attorney, Agent, or Firm — Schwegman Lundberg & Woessner, P.A.

(57) ABSTRACT

A dataset and some user selected columns of the dataset are received by a statistical analysis module for analysis. The statistical analysis module generates a score for each unselected column of the dataset based on statistical analysis of the unselected columns and all or a subset of the selected columns. A ranking of the unselected columns is presented to the user for selection of one additional column of the dataset, after which the remaining unselected columns are re-ranked according to their associated scores and once again displayed to the user. The user may continue selecting from among the ranked columns until a threshold number of columns has been selected, at which point the user may deselect a selected column in order to continue selecting additional columns. A visualization suggestion application program interface then matches the selected columns with compatible visualization configurations and presents some of these visualizations to the user.

17 Claims, 8 Drawing Sheets

(56) References Cited

U.S. PATENT DOCUMENTS

| | | | | |
|---|---|---|---|---|
| 2007/0147685 A1* | 6/2007 | Ericson | ............... | G06K 9/6253 |
| | | | | 382/225 |
| 2008/0059412 A1* | 3/2008 | Tarin | ................. | G06F 17/30592 |
| 2008/0104060 A1* | 5/2008 | Abhyankar | ....... | G06F 17/30643 |
| 2009/0287673 A1* | 11/2009 | Chronister | ........ | G06F 17/30994 |
| 2011/0119273 A1* | 5/2011 | Abhyankar | ....... | G06F 17/30643 |
| | | | | 707/740 |
| 2012/0179692 A1* | 7/2012 | Hsiao | ................. | G06F 17/30716 |
| | | | | 707/748 |
| 2013/0097177 A1* | 4/2013 | Fan | ................... | G06F 17/30554 |
| | | | | 707/748 |
| 2013/0103677 A1* | 4/2013 | Chakra | ............ | G06F 17/30994 |
| | | | | 707/723 |
| 2013/0144605 A1* | 6/2013 | Brager | ................ | G06F 17/3061 |
| | | | | 704/9 |
| 2014/0071138 A1* | 3/2014 | Gibson | ................ | G06T 11/206 |
| | | | | 345/501 |
| 2015/0039537 A1* | 2/2015 | Peev | .................. | G06K 9/00496 |
| | | | | 706/11 |
| 2015/0278213 A1* | 10/2015 | Anand | ............. | G06F 17/30554 |
| | | | | 707/723 |
| 2015/0278214 A1* | 10/2015 | Anand | ............. | G06F 17/30696 |
| | | | | 707/748 |
| 2015/0278371 A1* | 10/2015 | Anand | ............... | G06F 17/3053 |
| | | | | 707/723 |

OTHER PUBLICATIONS

"JSON", Wikipedia, [Online]. Retrieved from the Internet: <URL: http://en.wikipedia.org/w/index.php?title=JSON&oldid=622898649 >, (Aug. 26, 2014), 14 pgs.

"European Application Serial No. 14004376.1, Office Action dated Feb. 9, 2017", 9 pgs.

"European Application Serial No. 14004376.1, Response filed Sep. 16, 2016", 8 pgs.

* cited by examiner

| Column types selected by user | Relevancy Score Calculation for unselected Measure M' |
|---|---|
| None | ANOVA for all D's |
| M, MM, MMM, MMMM, MD, MMD, MMMD | Correlation Coefficient |
| D, DD, DDD, DDDD, MMD, MDDD, MMDD | ANOVA |

FIG. 4A

| Column types selected by user | Relevancy Score Calculation for unselected Dimension D' |
|---|---|
| None | ANOVA for all M's |
| M, MD, MMD, MDD, MDDD, MMDD | ANOVA |
| D, DD, DDD, DDDD | Chi-Square Test |
| MM, MMM, MMMM, MMMD | Correlation Coefficient |

FIG. 4B

| Combination | Visualization Type | Mark Type | X | Y | Mark | Size | Colour | Row/Column |
|---|---|---|---|---|---|---|---|---|
| D, M | Scenario 2 | Bar | M | D | D | | | |
| D, M₁, M₂ | Scenario 2 | Dot | M₁ | D | D | | M₂ | |
| D, M₁, M₂, M₃ | Scenario 2 | Dot | M₁ | D | D | M₂ | M₃ | |
| | Scenario 1 | Dot | M₁ | M₂ | D | | M₃ | |

VISUALIZATION SUGGESTION APPLICATION PROGRAMMING INTERFACE

TECHNICAL FIELD

This document relates generally to data analysis and visualization, and more particularly, but not by way of limitation, to systems and methods for automatically identifying columns of a dataset that are used to produce insightful visualizations for a user who may have limited (e.g., little or no) experience with the particular dataset.

BACKGROUND

In a typical business environment a user may be presented with reports including data relating to subjects or fields that the user may not be familiar with. A user who is not an expert in the relevant area of a report may be overwhelmed when it comes to discerning interesting relationships from the data of the reports. Furthermore, the user may desire an "insightful" visualization of the report data, for example a visualization that presents the subsets of data that exhibit a non-random and/or non-intuitive structure to the user in a form that is clear and visually appealing.

BRIEF DESCRIPTION OF THE DRAWINGS

Some embodiments are illustrated by way of example and not limitation in the figures of the accompanying drawings in which:

FIGS. 4A and 4B include tables illustrating example relationships between types of user-selected columns and the type of analysis performed on unselected columns.

DETAILED DESCRIPTION

In example embodiments, the following terms may include the meanings as shown below.

OLAP—Online Analytical Processing, includes a field of study that seeks to answer multi-dimensional analytic queries swiftly.

Dataset—includes a collection of data, usually in a table form. The table has m rows and n columns, where each column is a variable in the data collection, and each row is a member of the dataset across all columns.

Column—includes a variable in a dataset, consisting of a list of values from the dataset.

Measure—includes a numerical column in a dataset, often used in aggregational calculations over dimensions.

Dimension—includes a categorical column in a dataset, often used as an aggregator for numerical columns in the dataset called measures.

Cube—includes a dataset with at least one dimension and at least one measure used for data analysis. In OLAP cubes, data (measures) are categorized by dimensions. OLAP cubes are often pre-summarized across dimensions to drastically improve query time over relational databases.

JSON: Javascript Object Notation, a syntax for specifying Javascript objects.

Example systems and methods are described for enabling a matching of a user selection of columns of a dataset to a set of compatible visualization configurations of the selected columns of the dataset. Also described by way of example are systems and methods for generating a score for ranking unselected columns of a dataset based on their dependence from at least one user selected column of a dataset. In some example embodiments, systems and methods for suggesting compatible visualization configurations for selected columns of a dataset include processing OLAP cube data, including aggregating over dimensions of the OLAP data cube, among other things. In the following description, for purposes of explanation, numerous specific details are set forth in order to provide a thorough understanding of example embodiments. It will be evident, however, to one skilled in the art, that the disclosed systems and methods may be practiced without these specific details. It will also be evident that insightful visualization of datasets is not limited to the examples provided and may include other scenarios not specifically discussed.

In order to overcome some limitations of working with datasets, a system may adopt a preprocessing strategy to identify one or more columns of relevant data that contain insightful information, and after these columns have been identified they may then be ranked or sorted to determine which are the most insightful or useful to a user. Still further, the system may determine how the results of the statistical analysis may be visualized, for example according to a set of visualization guidelines, and suggest possible visualization configurations to a viewing user.

Example Visualization

Figure 1:
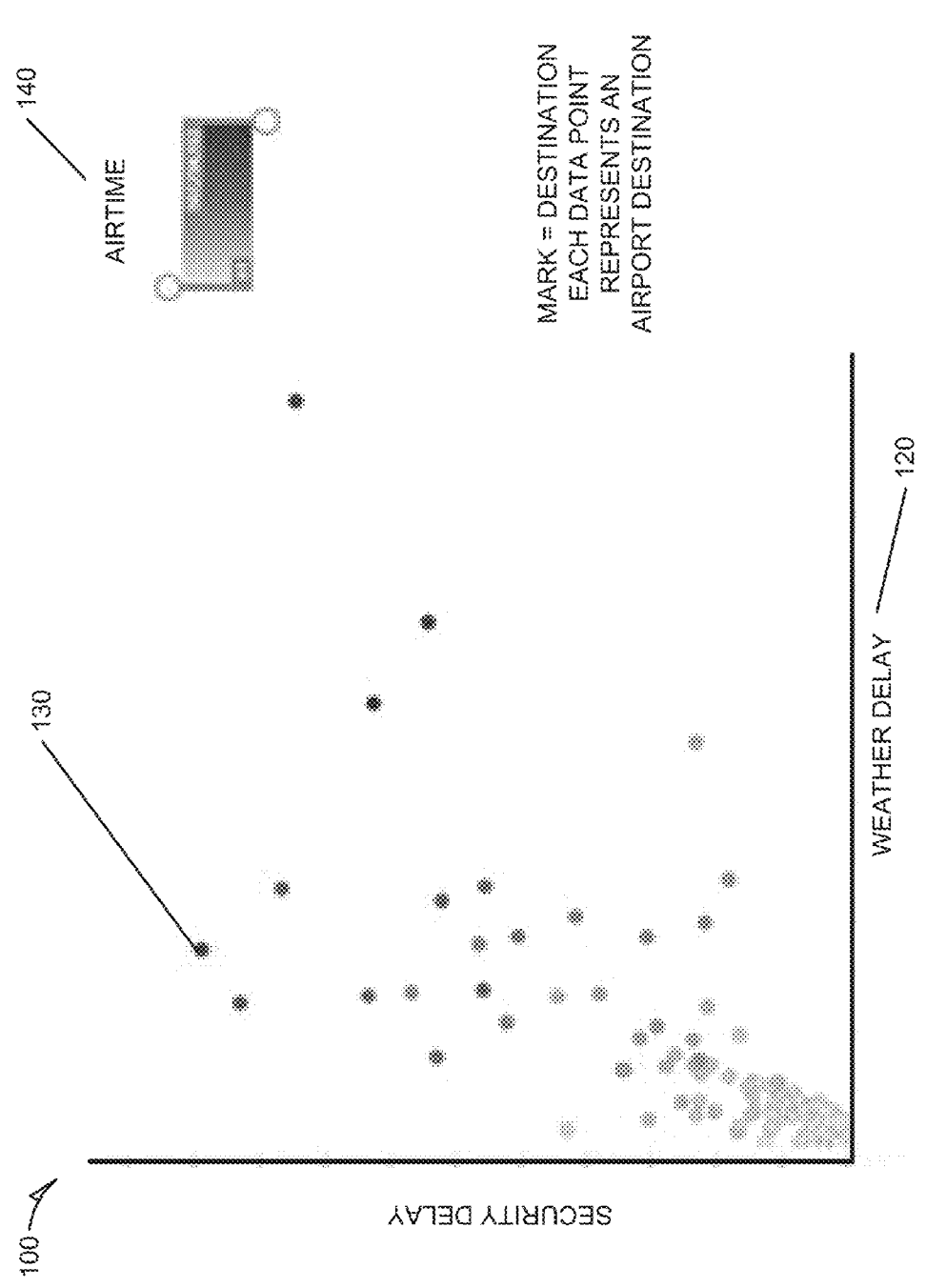
FIG. 1 is a visualization, according to an example embodiment, of selected data columns viewed according to a suggested visualization.

FIG. 1 includes a visualization 100 suggested for viewing a selection of columns of a dataset according to an example embodiment. In an example, a visualization suggestion application programming interface (API) may be used to suggest a specified number of compatible visualization configurations for a set of user selected columns of a dataset. In this example, the dataset includes OLAP data. An OLAP dataset consists of columns that may be classified as either measures or dimensions, which may be part of a hierarchical structure. An OLAP cube may be considered a generalization of a three-dimensional spreadsheet. For example, a company might wish to summarize financial data by product ID, by time-period, and by location to compare the relevant data in each dimension. Product ID, time, and location comparison are the data's dimensions. Each cell of the cube holds a number that represents some measure of the business, such as sales. The elements of a dimension can be organized as a hierarchy, a set of parent-child relationships, typically where a parent member summarizes or includes its children. Furthermore, parent elements may be aggregated as the children of another parent element of the OLAP data. For example, a monthly report may be the child of a quarterly report which is in turn the child of a yearly report, etc.

Before going into the details of the visualization guidelines, some concepts and their relation to the example visualizations herein are now described:

x-axis/y-axis: a measure or a dimension may be associated with an axis.

mark: represents the different values of the dimension associated with each data point that is represented in the visualization. For example, in the discussion of FIG. 1 (below), each mark (e.g., circle) represents a different "destination" data point.

mark type: the type of the data point representation, e.g., bar or dot.

color property: a measure or a dimension may be associated with the color property; different values are represented by different colors.

size property: the value of the measure associated with the size property determines the size of the mark, e.g., dot size.

row/column: this feature may be used to create a trellis chart.

visualization type: how the data points are displayed with respect to each other, e.g., comparison, stack, spread, scatter, group.

With these concepts in mind, an example visualization configuration that is compatible with a selection of columns of an OLAP dataset for displaying said selected columns is now described, particularly with respect to FIG. 1.

In the example of FIG. 1, the visualization 100 is suggested for a set of columns comprising a dimension and three measures (e.g., $DM_1M_2M_3$). The visualization type is "scatter" and the visualization 100 makes use of a mark 130 (circle) to represent each data point in the dimension "destination"; in this case each data point represents a location, e.g., airports. The visualization 100 of FIG. 1 also makes use of a color property to represent the measure "average 'Air Time' of each flight arriving at each destination" by coloring each mark 130 darker as the average flight time for airplanes arriving at the destination increases. The "Air Time" legend 140 indicates the functioning of the color property. It should be noted that a size property might also be used, for example, each mark 130 may be shown as larger or smaller depending on the volume of aircraft passing through the airport location each day. Furthermore, the measure "security delay" 110 is shown along the y-axis and the measure "weather delay" is shown along the x-axis.

Since most datasets may be hard to interpret for a user who isn't familiar with the subject matter of the dataset, the goal is to automatically identify columns of the measures and dimensions of the OLAP data that, in conjunction with any user selected columns of interest, result in insightful visualizations for the viewing user. In the context of this patent document, a visualization may be considered insightful or interesting if the data included in the visualization exhibits a non-random or non-intuitive relationship in a form that is clear and visually appealing. For example, a user may access a large volume of data from airports at multiple locations and find it impossible to make any meaningful observations regarding the large dataset. However, according to example methods and systems described herein, a user may select a column of the dataset that the user is interested in (e.g., weather delay) and the user may then be presented with a ranking of the unselected columns of the dataset according to whether the unselected column would produce an insightful visualization in conjunction with the selected column. For example, the ranking of columns might include "security delay" and "average air time" as the two most interesting columns to combine with the weather delay. This may be based on a statistical analysis as described more fully below. In this example, the user has selected these two columns for the visualization of airplane flight data, and the visualization suggestion API has suggested a visualization configuration resulting in the visualization 100 which may allow the user to see that the airport security delays 110 (y-axis) are clearly correlated with the weather delays 120 (x-axis) since their relationship exhibits a non-random pattern. Furthermore, a user may also see that the color property (average airtime) is also correlated with the delays as is evident from the darker colors as the delays increase. These relationships might be difficult to identify from a large set of non-visual data.

In order to identify columns of a large dataset that may result in insightful visualizations (e.g., include a non-random relationship), different types of statistical analysis methods may be applied to the same level of aggregation of the OLAP data as the one that will be shown in the visualization according to the user selected columns of the dataset. The visualization of these columns may be used to communicate insightful information to a viewing user by employing the tailored set of visualization selection guidelines according to the embodiments described herein.

Example Operating Environment

Figure 2:
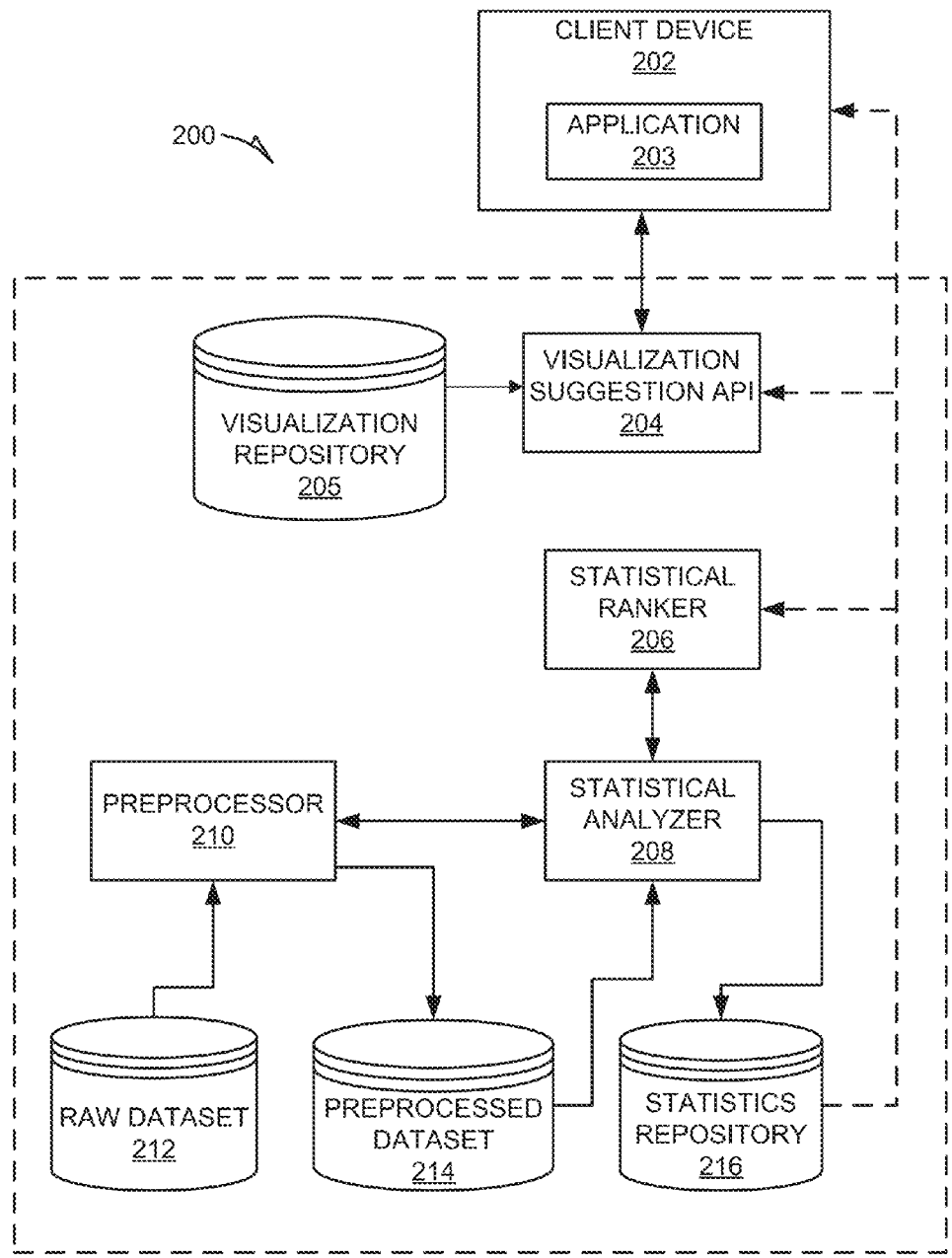
FIG. 2 is a block diagram illustrating a hardware environment and data flow for suggesting visualization configurations, according to an example embodiment.

FIG. 2 is a block diagram illustrating an environment 200 for operating a visualization suggestion API 204, according to an example embodiment. The environment 200 is an example environment within which methods for suggesting insightful visualization configurations of large datasets may be performed for a large raw dataset 212. The environment 200 may include a client device 202 (e.g., processing device such as a desktop computer, laptop, tablet or smartphone), an application 203 running on the client device 202, and elements of a system for processing and visualizing large datasets. The elements may include a visualization suggestion API 204, a statistical ranker 206, a statistical analyzer 208, a preprocessor 210, and data stored in containers (e.g., databases). The data includes a raw dataset 212, a preprocessed dataset 214, a visualization repository 205, and a statistics repository 216. It will be appreciated that although the elements are shown individually, any of the individual elements may be combined into a single element for performing the functions of each of the combined elements.

The client device 202 may have multiple applications installed on it, including an application 203 for processing data from large datasets. A user of client device 202 may desire or need to review or process a large raw dataset 212. In order to make sense of the large amount of data in raw dataset 212, which includes OLAP data in this example, a user of client device 202 (who may not even be familiar with the type of data) may request (through application 203) that a visualization suggestion API 204 assist the user in understanding the data in raw dataset 212 by providing suggested visualization configurations for a user selected group of columns of the raw dataset 212. The visualization suggestion API 204 may then request that the statistical ranker 206 provide it (e.g., via statistical repository 216) with a specified number of unselected columns of the raw dataset 212 according to a score associated with each unselected column via which each of the unselected columns may be ranked based on a non-random or non-intuitive relationship with least one of the selected columns. For example, the unselected columns may be ranked according to a score reflecting their degree of dependence from at least one of the selected columns.

The statistical ranker 206 may then request that the statistical analyzer 208 provide it with the results of a statistical analysis of each of the unselected columns of the raw dataset 212. In an example, the statistical analyzer 208 may then request that the preprocessor 210 generate a smaller, preprocessed and aggregated dataset, such that the results of at least one specified statistical analysis applied to this smaller preprocessed dataset 214 is the same as if it was applied to the original raw dataset 212. The at least one specified statistical analysis may include, for example, the correlation coefficient for measuring linear dependency. This may be accomplished, for example, by discarding unusable data and duplicate data. The preprocessing may include a data modeling component (e.g., type and hierarchy identification) if the data in the raw dataset 212 database has not already been modeled. Furthermore, the preprocessing may also include aggregation based on the user's column selection.

In an example, the preprocessing may provide, for each measure of an OLAP cube included in the OLAP data, discarding the measure based on more than half of the values of the measure being one of not-applicable ("NA"), zero or otherwise unusable.

In an example, the preprocessing may provide for aggregating over at least one dimension of the at least one OLAP cube; for example: aggregating over dimensions of the at least one OLAP cube containing 99% of the same value or aggregating over all of the dimensions of the at least one OLAP cube in decreasing cardinality until the raw dataset 212 has reached a threshold size.

In an example, the preprocessing may include data modeling including, for example: determining hierarchical relationships between the dimensions of the at least one OLAP cube; determining equivalencies between the dimensions and between the measures of the at least one OLAP cube; for each pair of equivalent dimensions, discarding one of the equivalent dimensions; and for each pair of equivalent measures, discarding one of the equivalent measures.

The resulting preprocessed dataset 214 may then be provided to the statistical analyzer 208 and/or be placed (e.g., cached) into the preprocessed dataset 214 database for storage.

The statistical analyzer 208 may then work directly on the smaller preprocessed dataset 214 for analysis of the unselected columns of data based on their degree of dependence from at least one of the selected columns. The statistical analyzer 208 may also store any statistical results of the analysis of the preprocessed dataset 214 in the statistics repository 216, e.g., a database. The statistics repository 216 may be directly accessed by the statistical ranker 206 and by the visualization suggestion API 204 and possibly by other clients, such as client device 202.

In an example, the statistical analyzer 208 may analyze the unselected columns of the preprocessed dataset 214 based on their degree of dependence from at least one of the selected columns by performing an analysis that includes the at least one specified statistical analysis that produces equal results for the raw and preprocessed database. For example, the analysis may include a correlation coefficient test.

In an example, the statistical analyzer 208 may analyze the unselected columns of preprocessed dataset 214 based on the at least one statistical analysis which includes an analysis of variance (ANOVA) test, a statistical model that analyzes the differences between group means.

In an example, the statistical analyzer 208 may analyze the unselected columns of preprocessed dataset 214 based on the at least one statistical analysis which includes a chi-squared test for measuring the independence of two dimensions.

In an example, the statistical analyzer 208 may select the type of analysis to perform on the unselected columns of preprocessed dataset 214 based on the selection of columns by a user. For example, the type of analysis that is selected may be based on the classification of the user selected columns as dimensions and measures. The preprocessor 210 may also generate preprocessed dataset 214 based on the user selection of columns so that the analysis of preprocessed dataset 214 using the selected type of analysis provides the same results as an analysis of raw dataset 212 using the selected type of analysis. Furthermore, the analysis performed on each unselected column may also be based on whether the unselected column satisfies the constraints (e.g., assumptions) of the particular analysis type. For example, if an unselected column is classified as a dimension, then the choice of analysis may also depend on the cardinality of the dimension satisfying specified criteria for the type of analysis. It is, of course, possible that two or more types of analysis are chosen by the statistical analyzer 208 to be performed on an unselected column.

In an example, the statistical analyzer 208 may analyze the unselected columns of the preprocessed dataset 214 based on their relationship with at least one user selected column, wherein the number of user-selected columns is at most a specified number, for example 4.

In an example, a user may be interested in a specific aggregation level (e.g., yearly data or quarterly data) of the OLAP data for review and in this case the statistical analyzer 208 may analyze the preprocessed dataset 214 at this aggregation level.

The statistical analyzer 208 may then provide the statistical ranker 206 with the results of the analysis of the unselected columns of preprocessed dataset 214. The statistical ranker 206 may then generate a score for each column based, for example, on the "effect size" of ANOVA for the column and rank the columns for insightfulness and/or interestingness based on this score.

In certain examples, the statistical ranker 206 may generate a score for each unselected column of the preprocessed dataset 214 based, for example, on the "p-value" of a chi-squared test or the correlation coefficient from a correlation coefficient test and rank the unselected columns for insightfulness and/or interestingness based on these scores.

In an example, if the statistical analyzer 208 has performed multiple types of analysis on an unselected column of the preprocessed dataset 214, then generating a score for said unselected column may be based on an average of multiple scores generated for said unselected column based on the multiple types of analysis.

In an example, the statistical ranker 206 may generate a null score for an unselected column of the preprocessed dataset 214 based on the unselected column failing to satisfy constraints of the statistical analysis types. For example, the unselected column may be classified as a dimension wherein the cardinality of the dimension fails to satisfy a specified threshold level.

The statistical ranker 206 may then provide a user of application 203 on client device 202 (e.g., via statistical repository 216) via visualization suggestion API 204) with a ranking of the unselected columns so that the user may select additional columns (for example, up to a threshold number) for inclusion in a visualization (e.g., visualization 100) of data columns.

In an example, after reaching a specified threshold number of selected columns, a user may deselect columns of data that have already been selected before selecting any additional columns for visualization.

In an example, each section/deselection of a column by a user triggers a new analysis (by the statistical analyzer 208) of the remaining unselected columns based on their relationship with at least one of the selected columns.

In an example, each section/deselection of a column by a user also triggers a new scoring and ranking (by the statistical ranker 206) of the remaining unselected columns based on the results of the analysis of these unselected columns by the statistical analyzer 208.

In an example, after a user has completed their selection of columns, the visualization suggestion API 204 may then match the selected columns with a specified number of compatible visualization configurations from the visualization repository 205.

In an example, the visualization repository 205 may include a set of visualization guidelines (configurations) for every combination of a specified number of columns of a dataset such as, for example, all possible combinations of 4 columns of a dataset where each column is either a dimension or a measure.

In an example, a visualization configuration in visualization repository 205 is compatible with a set of user selected columns of a preprocessed dataset 214 if:

1) the set of columns includes the same number of columns as the visualization configuration for each distinct column type (D or M). For example, if the selected set of columns include three columns of type "dimension", the visualization configuration should also have three columns of type "dimension" in order to match; and 2) each column of the set of columns satisfies any constraints defined in the visualization configuration for the corresponding column type, such as dimension cardinality or data type (e.g., temporal data).

In an example, the visualization suggestion API 204 may then present a user of application 203 on client device 202 with a specified number of compatible visualization configurations from visualization repository 205 that have been mapped to the selected set of columns of preprocessed dataset 214.

In an example, the visualization repository 205 may include visualization configurations based on guidelines for at least one of: a mark representing the different values of a dimension, a mark type for each type of data point representation, a mark color property associated with a measure or a dimension, a mark size property associated with the value of a measure, x-axis, y-axis, rows, columns and a visualization type that determines how the data points are displayed in relation to each other.

Example Data Modeling and Aggregation

An example embodiment includes a data modeling phase, where dimension hierarchies may be mapped and sets of equivalent dimensions and measures identified.

First, the dimensions of raw dataset 212 may be ordered based on their cardinality. For each combination of two dimensions the following query may be run:

SELECT D, D*, count(*)
FROM OLAP_CUBE
GROUP BY D, D*

If the result is in within a certain range (e.g. 95-100%), the dimensions may be considered to be dependent.

If a hierarchical relationship is identified, then the relationship may be inserted into the dimension hierarchy map, see for example Table 1. In this example D is considered an ancestor of D* since it includes or summarizes D*.

TABLE 1

Hierarchical Relationship between D and D*

| D | D* | Count(*) |
|---|----|----|
| A1 | X1 | 30 |
| A1 | X2 | 50 |
| A2 | X3 | 100 |
| A2 | X4 | 200 |
| A2 | X5 | 300 |

If a one-to-one relationship is identified between dimensions, then example embodiments may project on only one of the dimensions and discard any remaining dimensions since they may be considered as equivalent dimensions. See for example Table 2.

TABLE 2

One-to-one Relationship between D and D*

| D | D* | Count(*) |
|---|----|----|
| A1 | X1 | 30 |
| A2 | X2 | 100 |

Next, the algorithm identifies equivalent measures. For all pairs of measures, it calculates their correlation coefficient. In an example, if their correlation coefficient is greater than a user-defined threshold (typically this threshold is around 0.95), these measures may be considered as equivalent measures. Similarly to the dimension case, only one of the equivalent measures may be kept and the others discarded. In an example, the statistical analysis may be restricted to the remaining measures and dimensions.

Example Limitation of User Selected Columns

Figure 3:
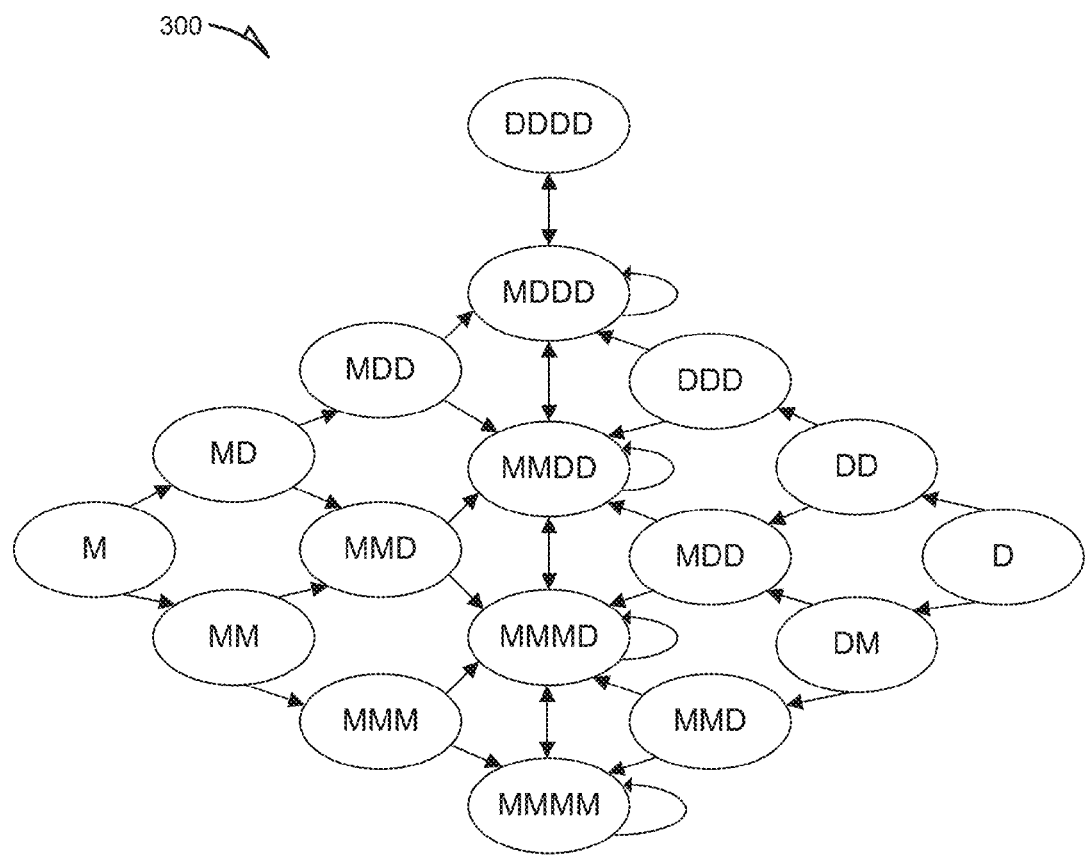
FIG. 3 includes a state diagram illustrating possible sequences for user selection of a column type, according to an example embodiment, based on a limit of four total columns selected.

FIG. 3 includes a state transition diagram 300 illustrating an example of a user selection process for columns of a particular OLAP dataset, e.g., preprocessed dataset 214. In this example, the user is limited to a maximum of four selected columns from the dataset for visualization. In this example, the ellipses in state transition diagram 300 represent states the statistical analyzer 208 may use to keep track of which combination of columns a user has selected so far in the visualization process. This may be used to help analyze the remaining unselected columns in relation to the selected columns since the analysis performed by the statistical analyzer 208 may be influenced by the current state of the statistical analyzer 208. The flows (e.g., arrows) in state transition diagram 300 represent the transitions between states made by the statistical analyzer 208 in response to particular user inputs including further selection or deselection of columns from a preprocessed dataset 214.

For example, in state transition diagram 300, an initial user input including a selection of two columns M and D will initialize the statistical analyzer 208 in the MD state. If a user then selects an additional column D, then the statistical analyzer 208 may transition to the next state: MDD, and if a user then selects an additional column D, then the statistical analyzer 208 may transition to the next state: MDDD. At that point the user has reached the specified threshold for the number of selected columns for the visualization: 4.

Therefore, the user may now deselect one of the previously selected columns before the user may be allowed to select another column from the preprocessed dataset 214 to be included in the visualization. If a user then deselects an additional column D, then the statistical analyzer 208 may transition to the previous state (MDD), and if a user then selects an additional column M, then the statistical analyzer 208 may transition to the next state (MMDD).

This type of state transition diagram may be very useful to the statistical analyzer 208 because a limited number of user selected columns results in only a limited number of possibilities for the combination of column types (e.g., D or M) of the user selected columns. These possible combinations may all be predefined as states of the statistical analyzer 208, and any analysis performed by the statistical analyzer 208 may then be influenced by its current state.

Example Choice of Statistical Analysis

FIGS. 4A and 4B include tables illustrating how a relevancy scoring method according to an example embodiment returns the relevance score for each unselected column in an OLAP cube given a set of at most four columns selected by a user. As mentioned above, the columns in the dataset are divided into two scenarios, depending, whether a measure (M) or dimension (D) is added. For example, the type of statistical test may be determined by the column types selected by the user, as shown in table 400 of FIG. 4A and table 420 of FIG. 4B. In the left column of table 400, the possible combinations of user selected columns are listed and the right column lists the corresponding type of analysis to be performed on the unselected columns of the dataset classified as measures in order to calculate a relevancy score for these unselected columns. In the left column of table 420, the possible combinations of user selected columns are listed, while the right column lists the corresponding type of analysis to be performed on the unselected columns of the dataset classified as dimensions in order to calculate a relevancy score for these unselected columns.

In certain examples (e.g., MMD in table 400), if there is more than one score for an unselected column, then an average of the scores may be used as the relevancy score for said unselected column. In this way it may be provided that there is always only one score for each unselected column for the purpose of ranking the unselected columns.

In certain examples, if the assumptions of the suggested statistical test are not fulfilled by the unselected column, then the relevancy score for said unselected column may be set to NULL.

Example Statistical Analysis and Ranking

In an example, and as mentioned above, the number of user selected columns in relation to which the statistical analyzer 208 may evaluate the remaining unselected columns may be restricted to a specified threshold number of columns. The selection of columns may be from a preprocessed dataset 214 which includes OLAP data. Since the values of measures may be calculated accurately based on the aggregated data, as mentioned above with respect to data modeling and aggregation, the statistical analyzer 208 does not require access to the original raw dataset 212. This may reduce the runtime since the amount of data being analyzed may be much less than the amount of data in the original raw dataset 212.

In an example, the output of the statistical analyzer 208 may be a score for each column, or the score may be generated by statistical ranker 206 based on the results of a statistical analysis provided by the statistical analyzer 208.

In example embodiments, different types of statistical tests may be performed on unselected columns of the preprocessed dataset 214.

In an example, the goal of the statistical analysis may be to determine the interestingness of the set of columns, in particular, a non-random relationship between an unselected column of the preprocessed dataset 214 and at least one of the user selected columns of the preprocessed dataset 214. As mentioned above, in an OLAP cube, each column is classified either as a measure (M) or as a dimension (D). In the case of a column classified as a measure, the OLAP data (including the OLAP cube) also includes a proposed aggregation method for the measure. All analyses should be run on the data at the same level of aggregation as the data to be shown in the visualization.

In example embodiments different statistical algorithms for calculating the dependency of columns may be used. The choice of the statistical method may be based on the column type and the cardinality of the dimension (if applicable). For each type of analysis, a relevance score may be generated as in the following examples:

ANOVA:

ANOVA stands for Analysis of Variance, a statistical algorithm for determining the difference between group means. In an OLAP scenario, the groups are reflected by the different values of a dimension. ANOVA may be calculated for raw data (DM combinations) as well as for aggregated data (D'DM combinations). Assumptions of the test include that D have cardinality of less than 10; for aggregated data, there are at least 5 values for each value in D. The relevancy score may be based on the effect size of ANOVA.

Correlation Coefficient:

The correlation coefficient test is a statistical test for measuring linear dependency. The correlation coefficient may be calculated for raw data (MM combinations) as well as for aggregated data (MMD combinations). Assumptions of the test include that D have cardinality of at least 20. The relevancy score may be based on the correlation coefficient.

Chi-Squared Test:

The chi-squared test is for measuring independence of two dimensions. The chi-squared test may be performed on aggregated data (DD combinations). There are several assumptions that have to be fulfilled by the underlying contingency matrix, e.g., there are at least 5 values for each value in D. The relevancy score may be based on the p-value of chi-squared test.

Ranking of Results:

In an example using ANOVA, the results may be are ranked based on their effect size, which is one of the statistics that is a result of ANOVA.

Example Visualization Configurations

Figure 5:
FIG. 5 includes a table illustrating suggested visualization configurations, according to an example embodiment, for different combinations of selected column types.

FIG. 5 includes a table 500 illustrating example visualization guidelines (e.g., configurations) that may be used to populate a visualization repository 205 in accordance with the systems and methods presented herein. For example, in table 500, visualization guidelines for user selected combinations of columns of a dataset are provided for combinations including a dimension and a measure (D, M), a dimension and two measures (D, $M_1$, $M_2$) and a dimension and three measures (D, $M_1$, $M_2$, $M_3$).

As can be seen in table 500, for a combination including a dimension and a measure (D, M) the visualization type is "scenario 2" (e.g., spread), the mark type is "bar", the x-axis is used for the measure M, the y-axis is used for the dimension D, and the mark is also used for dimension D.

As can be seen in table 500, for a combination including a dimension and two measures (D, $M_1$, $M_2$) the visualization type is "scenario 2" (e.g., spread), the mark type is "dot", the x-axis is used for the measure $M_1$, the y-axis is used for the dimension D, the mark is also used for dimension D and the color property is used for the measure $M_2$.

As can be seen in table 500, for a combination including a dimension and two measures (D, $M_1$, $M_2$, $M_3$) the visualization type is either "scenario 2" (e.g., spread) or "scenario 2" (e.g., group), the mark type is "dot" and the x-axis is used for the measure $M_1$.

If the visualization type is scenario 1, then the y-axis is used for the measure $M_2$, the mark is used for dimension D and the color property is used for the measure $M_3$.

If the visualization type is scenario 2, then the y-axis is used for the dimension D, the mark is used for dimension D, the color property is used for the measure $M_3$ and the color property is used for the measure $M_3$.

Example Mapping of Visualization Configurations

In an example, given a set of user selected columns (e.g., from a preprocessed dataset 214) and a set of visualization configurations (e.g., stored in a visualization repository 205), a specified number of visualization configuration(s) that are compatible with the given set of columns may be returned to a user. In an example, a visualization configuration may dictate how a set of columns should be arranged and represented in a chart and may also include constraints on the columns, such as dimension cardinality or column type (e.g., temporal data).

The visualization suggestion API 204 may map a given set of user selected columns to one or more visualization configurations (if any are applicable) by defining Javascript Object Notation (JSON) structures to represent the given set of columns and visualization configurations and providing a mapping algorithm that maps a set of columns to one or more matching visualization configurations.

In an example, a user might interact with an application (e.g., application 203), choosing a set of columns according to the example methods described herein. The application may then request (from the main application code to the visualization suggestion API 204) visualization configurations that match (e.g., are compatible with) the user's selection of columns. The application could then use the information returned from the visualization suggestion API 204 to facilitate further interaction with the user. It will be appreciated that the visualization suggestion API 204 could also be part of the main application code of application 203.

In an example, the visualization suggestion API 204 includes a mapping function that takes three inputs: user selected set of columns; visualization configurations describing desired visualizations under different column combinations; and a number (N) to describe the max number of compatible configurations to return. The mapping function may produce one output: the top-N (N=third argument for input; the number of matching configurations may be less than N, or even zero) matching configuration(s) based on the user selected set of columns.

In an example, the user may then utilize the output to construct visualization(s) incorporating the supplied set of columns. It is, of course, possible for no visualization configuration to be satisfied by the set of user selected columns and, in this case, the mapping function should return some error message to the user.

In certain examples, visualization configurations may be chosen based on what is deemed desirable by users. For example, they may be chosen by applying heuristics and experimentation to best fit criteria such as: useful information, easy to read and interpret and visually pleasing.

In an example, visualization configurations may be written into a formal language that can be easily interpreted by both human and computer. This may allow for easy incorporation of the configurations into a program (e.g., application 203) as well as being easier to update by a human.

The general structure of the supplied set of columns and configurations may follow the JSON schema as illustrated in the following examples.

User Selected Set of Columns

The set of user selected columns may be represented by a JSON structure that starts with a root, <COLUMNS_ROOT> as follows:
<COLUMNS_ROOT>
Array of one or more columns the user is interested in visualizing.
[<COLUMN>, . . . ]
<COLUMN>
Describes a column with attributes:

```
{
  <ATTRIBUTES>
}
<ATTRIBUTES>
```

A set of comma-separated attributes of the column where each attribute represents a key/value pair of the form:
<ATTRIBUTE_KEY>: <ATTRIBUTE_VALUE>.

There may be at least one attribute describing the column type, e.g., columnType: "dimension". Other attributes may be optional and are typically used to satisfy constraints listed in the visualization configuration (they can also be added as implementation-specific metadata to be used a specific way based on how the matching algorithm is implemented).

For example, a particular visualization configuration may include a constraint regarding a column being placed in the "x" axis, specifying that the column have a cardinality <=10. In this example, the column has an attribute for cardinality (e.g., cardinality: 5) and therefore the comparison may be made.

In an example, attributes may also be used to describe relationships between different columns, for example representing hierarchical relationships, or to describe special "enriched" column types (e.g., geographical and time types of a database).

Visualizations Configurations

The configuration may be represented by a JSON structure that starts with a root, <CONFIGS_ROOT > as follows:
<CONFIGS_ROOT>
An array of one or more configurations.
[<CONFIG>, . . . ]
<CONFIG>
Describes a single configuration for a given set of columns.

```
{
  columns: <COLUMNS>
  markType: <MARK_TYPE>
  viewMode: <VIEW_MODE>
}
```

<MARK_TYPE>
The mark-type to use for a configuration.
Ex: "bar", "text", "dot", "line", "tile"
<VIEW_MODE>
The view mode to use for a configuration.
Ex. "comparison", "stack", "spread", "group"

<COLUMNS>
Describes the columns involved in a configuration.
An array of one or more columns.
[<COLUMN>, . . . ]
<COLUMN>
Describes a single column involved in a configuration.

```
{
   type: <COLUMN_TYPE>
   locations: <COLUMN_LOCATIONS>
}
```

<COLUMN_TYPE>
Type of a column.
Ex: "dimension", "measure"
<COLUMN_LOCATIONS>
Array of one or more locations of where the column should be placed as part of this configuration.
[<COLUMN_LOCATION>, . . . ]
<COLUMN_LOCATION>
Describes where the column should be placed and any constraints the column needs to satisfy.

```
{
   location: <LOCATION>,
   constraints: <CONSTRAINTS>
}
```

<LOCATION>
Describes where (which component) to place the column within the configuration.
Ex: "x", "y", "value", "color", "transparency", "size"
<CONSTRAINTS>
Array of one or more constraints that need to be fulfilled for this column to be placed in this location in this configuration.
[<CONSTRAINT>, . . . ]
<CONSTRAINT>
Describes a constraint that needs to be fulfilled for this column to be placed in this location in this configuration.

```
{
   operator: <OPERATOR>,
   attribute: <CONSTRAINT_ATTRIBUTE>,
   arguments: <CONSTRAINT_ARGUMENTS>
}
```

Constraint is an expression of the form:
<CONSTRAINT_ATTRIBUTE><OPERATOR><CONSTRAINT_ARGUMENTS>
For example, "cardinality LESS_EQUAL 10" describes that a column should have a cardinality <=10
<OPERATOR>
Operator for a constraint.
Ex. "EQUAL", "NOT_EQUAL", "GREATER", "GREATER_EQUAL", "LESS", "LESS_EQUAL", "BETWEEN"
<CONSTRAINT_ATTRIBUTE>
Which attribute on the column this constraint operates on.
<CONSTRAINT_ARGUMENTS>
Array of one or more arguments for the constraint.
[<CONSTRAINT_ARGUMENT>, . . . ]
The number of constraint arguments needed is based on which operator is used. For example, "EQUAL" would have just one argument since the test for equality is only against one value, and "BETWEEN" would have two arguments since the test for whether a value falls between something relies on defining a left and right bound.
<CONSTRAINT_ARGUMENT>
Argument used for the constraint
Mapping Algorithm
In an example embodiment, the mapping algorithm may be implemented as follows:
1. Group user selected columns together based on their column type. For example, all columns of type "dimension" will be grouped together, and all columns of type "measure" will be grouped together. The relative ordering of columns may be preserved (e.g., the grouping is stable—if two columns have the same column type and one is located after the other pre-grouping, this ordering will still persist post-grouping).
2. For each visualization configuration:
   a. Group column configurations within the visualization configuration together based on their column type. This may be done the same way as for the user selected columns.
   b. Check that the number of groups and group sizes for each group type in the visualization configuration match the corresponding values in the user selected columns. If not, this configuration is not compatible (does not match), and the algorithm may move on to the next configuration if one exists.
   c. Check that constraints for all groups in the configuration are satisfied by groups of the user selected columns.
      i. For each column configuration group:
         1. For each permutation of columns within the column configuration group:
            a. For each column configuration in the permutation:
               i. Check that the column configuration is satisfied by the associated column in the user selected columns group. Associativity is based on the position of the column/column configuration in their respective arrays, so column i will be associated with column configuration i.
               For each constraint in the column configuration, check that the associated supplied column satisfies it.
               ii. If at any point a column configuration is not satisfied, short-circuit out of all loops to the next visualization configuration.
         2. If a permutation of the column configuration group is satisfied, keep track of the ordering and move on to the next column configuration group.
      ii. If all column groups in the configuration are satisfied, the configuration is considered compatible (e.g., a match). Keep track of this configuration, along with its column configuration permutation orderings. If N compatible visualization configurations have been mapped, short circuit out to the root of the mapping algorithm to return them to the user.
   Otherwise, move on to the next visualization configuration if one exists.
3. Return top-N visualization configurations that match the supplied set of columns. The actual number of visualization configurations returned may be less than N if there are fewer than N configurations that match the supplied set of columns.
Ordering of Visualization Configurations
In an example, the mapping algorithm loops through each visualization configuration, and the order in which they are provided to the visualization suggestion API 204 matters. This means that if there are multiple equivalent configurations that match a user selected set of columns, they will be provided in the order they are encountered. In certain examples, a finer-grained control over the order of such configurations may be achieved by providing more constraints within each configuration to help differentiate configurations that seem equivalent such that they are no longer determined to be equivalent.

Ordering of Columns

In an example, the ordering of columns supplied to the visualization suggestion API 204 for a given column type and the ordering of column configurations for a given column type matter. In this case, the mapping algorithm may consider permutations of columns to be equal in terms of compatibility with a user selection of columns; therefore they will be checked and returned to the user based on the order in which they are generated.

For example, assume the ordering of permutations of three columns is checked as follows:

1, 2, 3;
1, 3, 2;
2, 1, 3;
2, 3, 1;
3, 1, 2; and
3, 2, 1.

If [2, 1, 3] is the first ordering that matches, then [2, 1, 3] will be recommended first even if, for example, [3, 1, 2] also matches.

Visualization Configuration Examples

In an example, a visualization configuration matches a user selected set of columns consisting of only one column of type "dimension". The visualization configuration may describe that the dimension is to be placed in the "value" component of the visualization and should satisfy the constraint that it is an "ordinal" dimension. The mark type of the visualization may be "text" and the view type may be "group".

```
{
    columns : [{
        type : "dimension",
        locations : [{
            location : "value",
            constraints : [{
                operator : "EQUAL",
                attribute : "ordinal",
                arguments : [true]
            }]
        }]
    }],
    markType : "text",
    viewType : "group"
}
```

A user selected set of columns that would match this configuration may be one column of type "dimension" with an attribute "ordinal" equal to "true":

```
[
    {
        type: "dimension",
        entityID: "D1",
        ordinal: true
    }
]
```

In an example embodiment, a more complex mapping is provided for a user selected set of columns consisting of one column of type "dimension" and three columns of type "measure". The single dimension may be placed into the "value" and "color" component, and the three measures are to be placed into the "y", "size", and "x" components. The ordering of each measure's definition in the user selected set of columns determines which measure goes into which component. The mark type for this configuration is "dot", and the view type is "comparison".

```
{
    columns : [{
        type : "dimension",
        locations : [{
            location : "value"
        }, {
            location : "color"
        }]
    }, {
        type : "measure",
        locations : [{
            location : "y"
        }]
    }, {
        type : "measure",
        locations : [{
            location : "size"
        }]
    }, {
        type : "measure",
        locations : [{
            location : "x"
        }]
    }],
    markType : "dot",
    viewType : "comparison"
}
```

An example user selected set of columns that would match this configuration might be the following:

```
[
    {
        type: "dimension",
        entityID: "d1"
    },
    {
        type: "measure",
        columnID: "m1"
    },
    {
        type: "measure",
        columnID: "m2"
    },
    {
        type: "measure",
        columnID: "m3"
    }
]
```

Example Methods

Further methods will be described below; in particular the methods will be described in relation to the previously described figures and elements.

Figure 6:
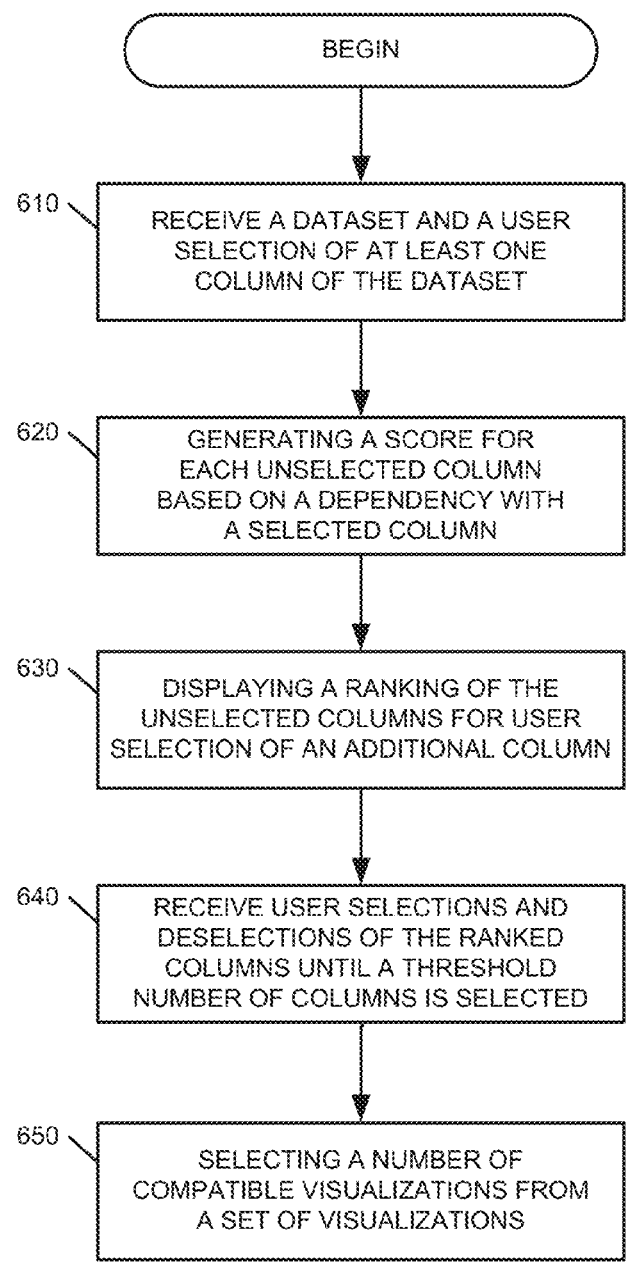
FIG. 6 is a flowchart illustrating a method, according to an example embodiment, for suggesting a visualization configuration for selected columns of a dataset.

FIG. 6 is a flowchart illustrating a method 600 for suggesting a number of visualization configurations that are compatible with a user selected set of columns of a dataset, according to an example embodiment. In an example, the method 600 may include operations for: receiving a dataset and a user selection of columns of the dataset at operation 610, generating a score for each unselected column of the dataset at operation 620; displaying a ranking of the unselected columns at operation 630; receiving user selections of unselected columns until a threshold number is reached at operation 640; and selecting a specified number of compatible visualization configurations for the user selected columns at operation 650.

In an example, the method 600 may begin at operation 610 with the raw dataset 212 being accessed by a preprocessor 210, which generates a smaller preprocessed dataset 214 from the raw dataset 212 such that at least one specified type of statistical analysis produces the same results when applied to each of the datasets 212, 214. In certain examples, the preprocessor 210 may discard useless data and/or duplicative data to generate the preprocessed dataset 214. The preprocessed dataset 214 and a user selection of columns from the preprocessed dataset 214 may then be accessed by the statistical analyzer 208.

At operation 620, the method 600 may continue with the statistical analyzer 208 analyzing the unselected columns of the preprocessed dataset 214 based, at least in part, on the at least one specified type of statistical analysis in order to measure the degree of dependency between each of the unselected columns of preprocessed dataset 214 and at least one of the user selected columns of preprocessed dataset 214. For example, the data of the preprocessed dataset 214 may be subjected to an ANOVA or chi-squared test in order to identify potentially interesting columns of the preprocessed dataset 214. The statistical analyzer 208 (or the statistical ranker 206) may then generate a score for each column of the preprocessed dataset 214 based on the analysis of the preprocessed dataset 214. In certain examples, this may be based on the ANOVA "effect size" of each column.

At operation 630, the statistical analyzer 208 or the statistical ranker 206 may provide a user of application 203 on client device 202 (e.g., via statistical repository 216) with a ranking of the unselected columns so that the user may select additional columns (for example, up to a threshold number) for inclusion in a visualization of data columns.

At operation 640, the statistical analyzer 208 may receive user input including a selection of an unselected column of the preprocessed dataset 214. In an example, after reaching a specified threshold number of selected columns, a user may deselect columns of data that have already been selected before selecting any additional columns for visualization. In an example, each section/deselection of a column by a user triggers a new analysis (by the statistical analyzer 208) of the remaining unselected columns based on their relationship with at least one of the selected columns and a new scoring and ranking by the statistical ranker 206 so that a user may be presented with an updated ranking upon which to base further selections of columns.

Finally, at operation 650, the method 600 may include the visualization suggestion API 204, after a user has completed their selection of columns, mapping the selected columns with a specified number of compatible visualization configurations from the visualization repository 205. In certain examples, the visualization repository 205 may include a set of visualization guidelines for every combination of a specified number of columns of a dataset. For example, guidelines may be included for all possible combinations of four columns of a dataset where each columns is either a dimension or a measure.

Figure 7:
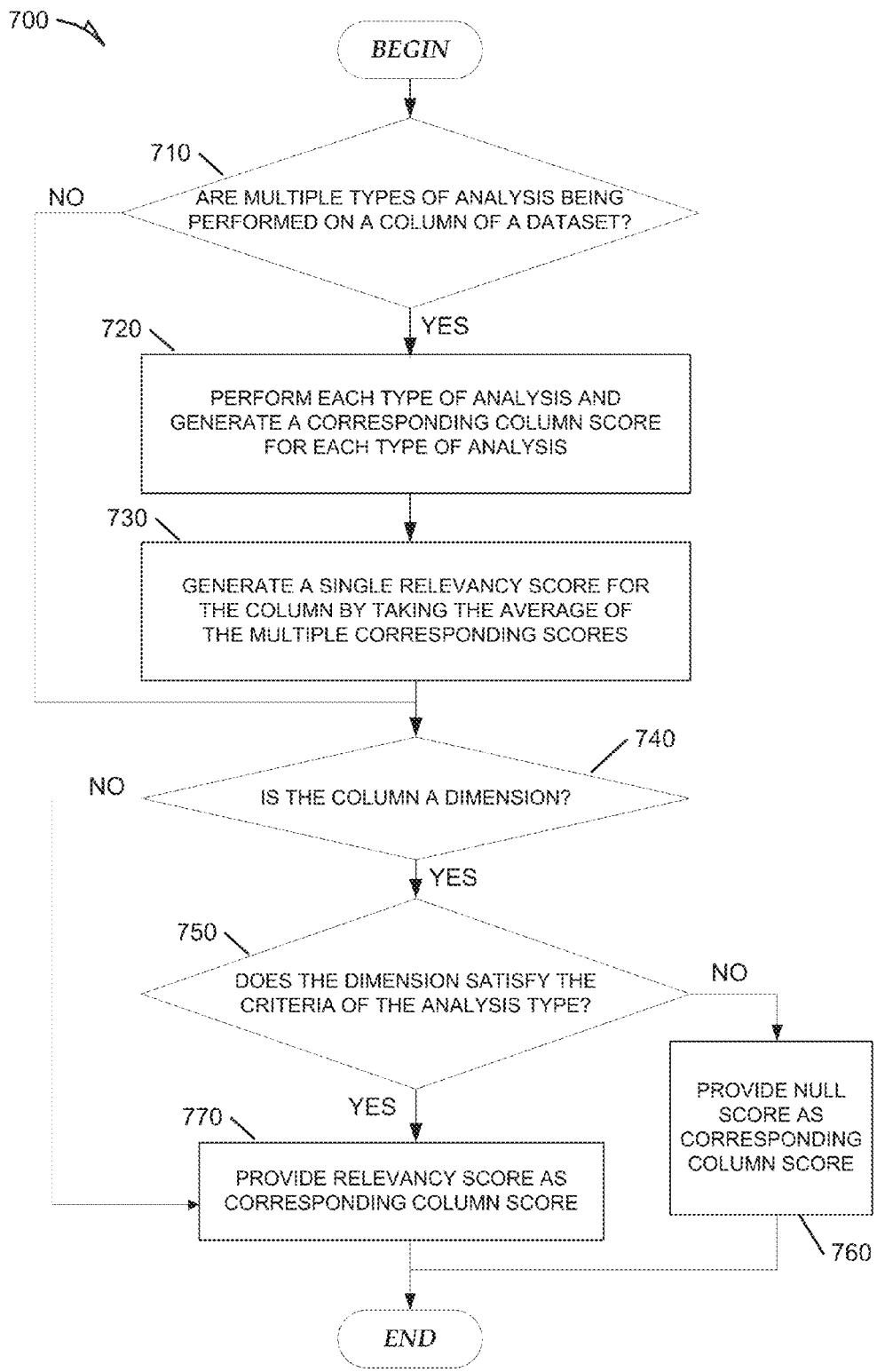
FIG. 7 is a flowchart illustrating a method for generating a score for unselected columns of a dataset according to an example embodiment.

FIG. 7 is a flowchart illustrating a method 700 for generating a relevancy score for each unselected column of a preprocessed dataset 214. In an example, the method 700 may include operations for: determining whether multiple types of analysis have been performed in regard to an unselected column at operation 710; if so then performing each type of analysis and generating a corresponding column score for each type of analysis at operation 720, and if not then proceeding directly to operation 740; generating a single overall score for the column by taking the average of the multiple corresponding scores at operation 730; determining whether a column is classified as a dimension at operation 740; if so, then determining whether it satisfies the criteria of the analysis type for that column at operation 750, and if not, then providing the generated relevancy score for the column at operation 770; if it does not satisfy the criteria at operation 750, then providing a null score for the column at operation 760, and if it does satisfying the criteria, providing the generated relevancy score for the column at operation 770.

In an example, the method 700 may begin at operation 710 with the statistical analyzer 208 selecting the type of analysis to perform on the unselected columns of preprocessed dataset 214 based on the selection of columns by a user and then determining if multiple types of analysis have been performed on an unselected column of the preprocessed dataset 214. If multiple types of analysis have been chosen for an unselected column of the preprocessed dataset 214, the statistical ranker 206 may then perform the chosen tests on the unselected column at operation 720. If multiple types of analysis have not been performed on an unselected column of the dataset, then the method 700 proceeds to operation 740. At operation 730, the statistical ranker 206 (or the statistical analyzer 208) may then generate a score for said unselected column based on an average of multiple scores generated for said unselected column based on the multiple types of analysis performed on the unselected column of preprocessed dataset 214.

At operation 740, the statistical analyzer 208 may determine if an unselected column of preprocessed dataset 214 is classified as a dimension and, if not, then the method 700 may proceed to operation 770. If the unselected column is a dimension, then at operation 750 the statistical analyzer 208 may determine whether the dimension satisfies any criteria (e.g., assumptions) of the type(s) of statistical analysis performed on the unselected column. If the unselected column of preprocessed dataset 214 is a dimension that does not satisfy the criteria (e.g., assumptions) of the type(s) of statistical analysis performed on the unselected column, then the method 700 proceeds to operation 760 where the statistical ranker 206 (or the statistical analyzer 208) may provide a null score for the unselected column. Finally, if the dimension does satisfy the criteria, then at operation 770, the statistical ranker 206 (or the statistical analyzer 208) may provide a relevancy score for the unselected column of preprocessed dataset 214, for example an average score if multiple types of analysis have been applied to the unselected column.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures deployed, in example embodiments.

Example Architecture and Machine-Readable Medium

Figure 8:
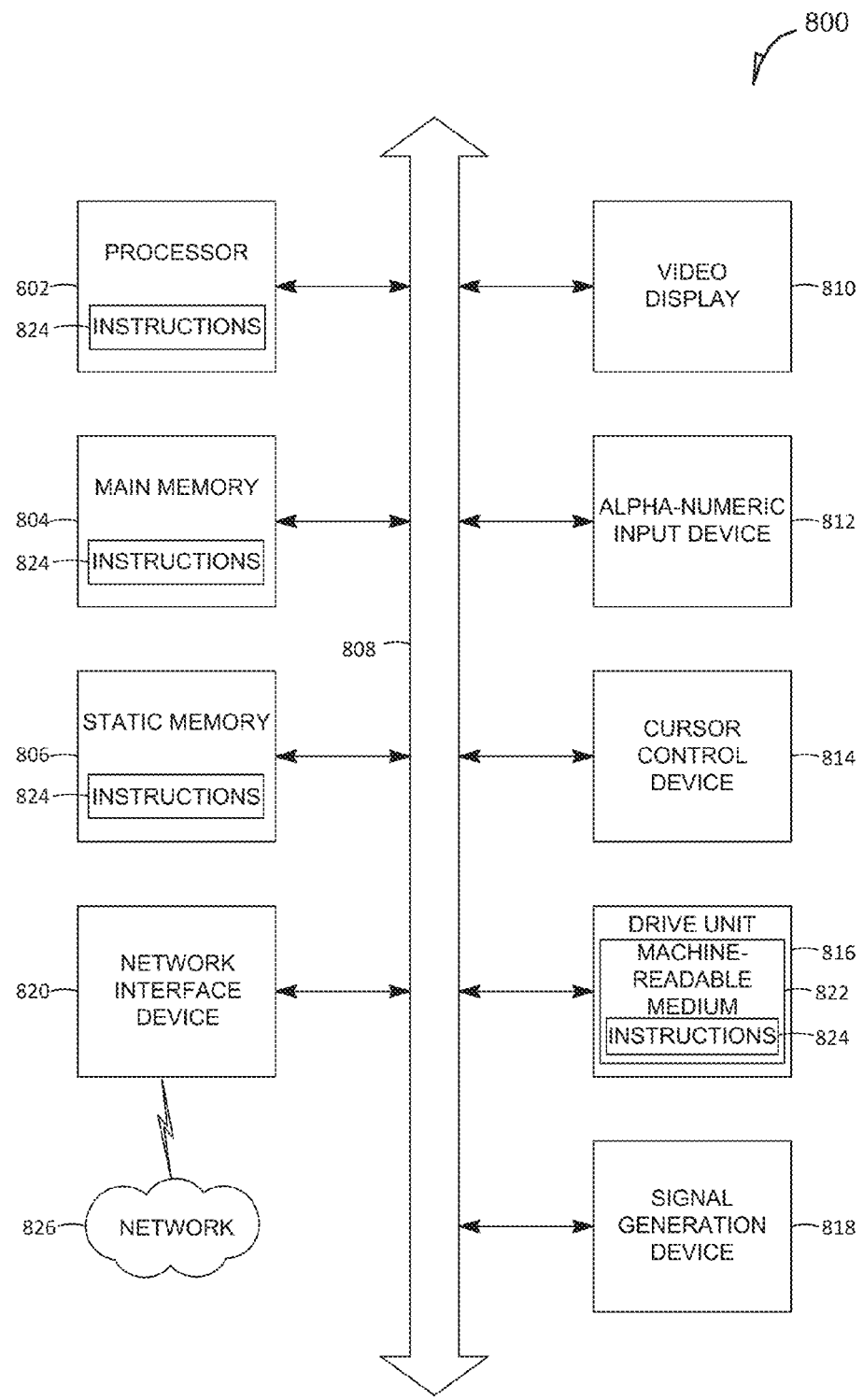
FIG. 8 is a diagrammatic representation of a machine in the example form of a computer system within which a set of instructions for causing the machine to perform any one or more of the methodologies discussed herein may be executed.

FIG. 8 is a block diagram of a machine in the example form of a computer system 800 within which instructions 824 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal displays (LCD) or a cathode ray tube (CRT)). The computer system 800 also includes an alphanumeric input device 812 (e.g., a keyboard), a cursor control (user interface (UI) navigation) device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, static memory 806, and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies disclosed herein, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for discovery and communication between applications running in sandboxes on a processing device have been described. Although the present disclosure includes references to specific example embodiments, it will be evident that various modifications and changes may be made to these embodiments without departing from the broader spirit and scope of the present disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. In the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. The following claims are incorporated into the Detailed Description, with each claim as a separate embodiment.

The invention claimed is:

1. A method comprising:
   accessing a dataset and a user selection of at least one column of the dataset by at least one hardware processor, the dataset including at least one online analytical processing (OLAP) cube with each column of the cube classified as a measure or classified as a dimension;
   determining, by the at least one hardware processor, which type of analysis to perform on each of the unselected columns of the dataset based on:
      the classification of the at least one column selected by a user; and
      the unselected column being classified as a dimension and a cardinality of the dimension satisfying specified criteria;
   analyzing the dataset, by the at least one hardware processor, to generate a score for each unselected column of the dataset based on a degree of dependency between each of the unselected columns and the at least one selected column;
   iteratively displaying a ranking of the unselected columns according to the scores, and accessing a user selection of one more column by the at least one hardware processor until a threshold number of columns has been selected;
   accessing the selected columns of the dataset by the at least one hardware processor; and
   selecting, by the at least one hardware processor, a specified number of visualization configurations compatible with the selected columns from a set of visualization configurations and providing the compatible visualization configurations to a user, wherein the selecting is based at least in part on a quantity of the selected columns and based at least in part on at least one constraint of a visualization configuration of the specified number of visualization configurations.

2. The method of claim 1, further comprising:
   accessing user input by the at least one hardware processor, the input including a deselection of one of the selected columns based on the threshold number of columns being selected.

3. The method of claim 1, further comprising:
   aggregating over unselected dimensions of the cube based on the unselected dimensions having cardinality less than 10;
   analyzing, by the at least one hardware processor, the dataset by performing an analysis of variance (ANOVA) test on the unselected columns of the dataset and on aggregated data; and
   generating a score for each unselected column of the dataset based on an effect size of the ANOVA test.

4. The method of claim 1, further comprising:
   aggregating over unselected dimensions of the cube based on the unselected dimensions having cardinality of at least 20;
   analyzing, by the at least one hardware processor, the dataset by performing a correlation coefficient test on the unselected columns of the dataset and on aggregated data; and
   generating a score for each unselected column of the dataset based on a p-value of the correlation coefficient test.

5. The method of claim 1, further comprising:
   determining, by the at least one hardware processor, that multiple types of analysis be performed on an unselected column of the dataset;
   generating a score for said unselected column based on an average of multiple scores generated for said unselected column by the multiple types of analysis; and
   generating a null score for an unselected column based on the unselected column being classified as a dimension and the cardinality of the dimension failing to satisfy the specified criteria.

6. The method of claim 1, wherein a visualization configuration specifies how a set of columns are arranged and represented in a chart and includes constraints regarding the columns, the method further comprising:
   determining, by the at least one hardware processor, that a visualization configuration is compatible with the selected columns based on:
      a number of selected columns being equal to a number of columns in the visualization;
      a number of selected columns classified as dimensions being equal to a number of columns classified as dimensions in the visualization;
      a number of selected columns classified as measures being equal to a number of columns classified as measures in the visualization; and
      the selected columns satisfying constraints of the visualization regarding columns.

7. A system comprising:
   at least one processors;
   a memory coupled to the at least one processor, the memory including instructions which, when executed by the at least one processor cause the system to perform operations comprising:
      accessing a dataset and a user selection of at least one column of the dataset the dataset including at least one online analytical processing (OLAP) cube with each column of the cube classified as a measure or classified as a dimension;
      determining, by the at least one processor, which type of analysis to perform on each of the unselected columns of the dataset based on:
         the classification of the at least one column selected by a user; and
         the unselected column being classified as a dimension and a cardinality of the dimension satisfying specified criteria;
      analyzing the dataset, by the at least one processor, to generate a score for each unselected column of the dataset based on a degree of dependency between each of the unselected columns and the at least one selected column;
      iteratively display a ranking of the unselected columns according to the scores, and accessing a user selection of one more column by the at least one processor until a threshold number of columns has been selected;

accessing the selected columns of the dataset;

selecting a specified number of visualization configurations compatible with the selected columns from a set of visualizations, wherein the selecting is based at least in part on a quantity of the selected columns and based at least in part on at least one constraint of a visualization configuration of the specified number of visualization configurations; and providing the compatible visualization configurations to a user.

8. The system of claim 7, the operations further comprising accessing, by the at least one processor, user input including a deselection of one of the selected columns based on the threshold number of columns being selected.

9. The system of claim 7, the operations further comprising:

aggregating over unselected dimensions of the cube based on the unselected dimension having cardinality less than 10;

analyzing the dataset, by the at least one processor, by performing an analysis of variance (ANOVA) test on the unselected columns of the dataset and on aggregated data; and generating a score for each unselected column of the dataset based on an effect size of the ANOVA test.

10. The system of claim 7, the operations further comprising:

aggregating over unselected dimensions of the cube based on the unselected dimension having cardinality of at least 20;

analyzing the dataset, by the at least one processor, by performing a correlation coefficient test on the unselected columns of the dataset and on aggregated data; and generating a score for each unselected column of the dataset based on a p-value of the correlation coefficient test.

11. The system of claim 7, the operations further comprising:

determining that multiple types of analysis be performed on an unselected column of the dataset;

generating a score for said unselected column based on an average of multiple scores generated for said unselected column by the multiple types of analysis; and generating a null score for an unselected column based on the at least one column selected by the user being classified as a dimension and the cardinality of the dimension failing to satisfy the specified criteria.

12. The system of claim 7, wherein:

a visualization configuration specifies how a set of columns are arranged and represented in a chart and includes constraints regarding the columns; and the at least one processor is used to determine that a visualization configuration is compatible with the selected columns based on:

a number of selected columns being equal to a number of columns in the visualization;

a number of selected columns classified as dimensions being equal to a number of columns classified as dimensions in the visualization;

a number of selected columns classified as measures being equal to a number of columns classified as measures in the visualization; and the selected columns satisfy constraints of the visualization regarding columns.

13. A non-transitory machine-readable storage medium including instructions that, when executed on at least one processor of a machine, cause the machine to perform the operations comprising:

accessing a dataset and a user selection of at least one column of the dataset by at least one hardware processor, the dataset including at least one online analytical processing (OLAP) cube with each column of the cube classified as a measure or classified as a dimension;

determining, by the at least one hardware processor, which type of analysis to perform on each of the unselected columns of the dataset based on:

the classification of the at least one column selected by a user; and the unselected column being classified as a dimension and a cardinality of the dimension satisfying specified criteria;

analyzing the dataset, by the at least one hardware processor, to generate a score for each unselected column of the dataset based on a degree of dependency between each of the unselected columns and the at least one selected column;

iteratively displaying a ranking of the unselected columns according to the scores, and accessing a user selection of one more column by the at least one hardware processor until a threshold number of columns has been selected;

accessing the selected columns of the dataset by the at least one hardware processor; and selecting, by the at least one hardware processor, a specified number of visualization configurations compatible with the selected columns from a set of visualization configurations and providing the compatible visualization configurations to a user, wherein the selecting is based at least in part on a quantity of the selected columns and based at least in part on at least one constraint of a visualization configuration of the specified number of visualization configurations.

14. The non-transitory machine-readable storage medium of claim 13, wherein the operations further comprise:

accessing user input by the at least one hardware processor, the input including a deselection of one of the selected columns based on the threshold number of columns being selected.

15. The non-transitory machine-readable storage medium of claim 13, wherein the operations further comprise:

aggregating over unselected dimensions of the cube based on an unselected dimension having cardinality less than 10;

analyzing the dataset, by the at least one hardware processor, by performing an analysis of variance (ANOVA) test on the unselected columns of the dataset and on aggregated data; and generating a score for each unselected column of the dataset based on an effect size of the ANOVA test.

16. The non-transitory machine-readable storage medium of claim 13, wherein the operations further comprise:

determining, by the at least one hardware processor, that multiple types of analysis be performed on an unselected column of the dataset;

generating a score for said unselected column based on an average of multiple scores generated for said unselected column by the multiple types of analysis; and generating a null score for an unselected column based on the at least one column selected by the user being classified as a dimension and the cardinality of the dimension failing to satisfy the specified criteria.

17. The non-transitory machine-readable storage medium of claim 13, wherein:
- a visualization configuration specifies how a set of columns should be arranged and represented in a chart and includes constraints regarding the columns; and
- the operations further comprise determining, by the at least one hardware processor, that a visualization configuration is compatible with the selected columns based on:
  - a number of selected columns being equal to a number of columns in the visualization;
  - a number of selected columns classified as dimensions being equal to a number of columns classified as dimensions in the visualization;
  - a number of selected columns classified as measures being equal to a number of columns classified as measures in the visualization; and
  - the selected columns satisfy constraints of the visualization regarding columns.

\* \* \* \* \*